United States Patent [19]

Morris

[11] Patent Number: 4,986,558

[45] Date of Patent: Jan. 22, 1991

[54] ATTACHMENT FOR MECHANIC'S CREEPER

[76] Inventor: Philip W. Morris, 9437 E. Corral, Yuma, Ariz. 85365

[21] Appl. No.: 369,691

[22] Filed: Jun. 21, 1989

[51] Int. Cl.[5] .......................... B25H 5/00; B62B 11/00

[52] U.S. Cl. ..................................... 280/32.6; 362/234

[58] Field of Search ................ 280/32.6, 32.5; 108/50; 248/129, 311.2; 362/249, 234; 224/42.11, 42.42

[56] References Cited

U.S. PATENT DOCUMENTS

| | | | |
|---|---|---|---|
| 2,291,094 | 7/1942 | McCarthy | 280/32.6 X |
| 4,244,594 | 1/1981 | Hines . | |
| 4,477,863 | 10/1984 | Walz | 362/249 X |
| 4,570,957 | 2/1986 | Rose . | |
| 4,744,015 | 5/1988 | Lai | 362/234 X |

FOREIGN PATENT DOCUMENTS

| | | | |
|---|---|---|---|
| 796203 | 4/1936 | France | 280/32.6 |

*Primary Examiner*—Charles A. Marmor
*Assistant Examiner*—Alan M. Kagen

[57] ABSTRACT

A handy attachment for a mechanics creeper that provides a tool storage tray and a plurality of lights for illuminating areas of a vehicle body that would otherwise be indistinct. One or more high intensity lights are mounted on the attachment to illuminate partially hidden vehicle surfaces, e.g. grease-encrusted bolt heads recessed upwardly within small clearance spaces. The attachment includes means for operatively mounting thereon dry cell batteries, used to power the lights.

3 Claims, 1 Drawing Sheet

ATTACHMENT FOR MECHANIC'S CREEPER

BACKGROUND AND SUMMARY OF THE INVENTION

This invention relates to an attachment for a floor creeper. A floor creeper is here broadly defined as a horizontal rectangular panel having four caster wheels located on its undersurface for rolling engagement on a garage floor. A person removing or installing components on an automotive vehicle will sometimes use a floor creeper to reach vehicle surfaces that are inaccessible from points alongside the vehicle. The person will lie in a prone position with his back on the creeper surface. By using his arms and/or feet he can guide the creeper into the space beneath the vehicle to inspect, repair or replace vehicle components on the vehicle undersurface. In many cases the creeper has a headrest at one end; the person positions his head on the headrest and looks up to view bolts, fasteners, components, etc. on the vehicle.

In many cases there is insufficient light to view the componentry from underneath the vehicle. The use of trouble lights somewhat alleviates this problem. However, trouble lights are not always fully effective, since there is not always a suitable place to hang a trouble light so that the light is directed into the specific area where it is most needed. Additionally, trouble lights require the use of extension cords, which means that trouble lights cannot be used in yards or on driveways remote from household electrical outlets. Extension cords are disadvantageous in that the mechanic can inadvertantly run the creeper over the cord and/or dislode the electrical outlet with his arm or leg.

The present invention relates to an electric light attachment for a floor creeper, whereby the mechanic is enabled to have a clear view of the undersurface areas of an automotive vehicle while lying prone on the creeper. The attachment includes means for supporting (housing) a number of dry cell batteries, so that the electric lights are powered without using an extension cord The mechanic can manipulate the creeper underneath the vehicle without fear of running over a extension cord or otherwise dislodging such a cord from an electrical outlet.

The attachment preferably includes two different types of lights. Two elongated fluorescent lights are located along the side edges of the creeper to provide general illumination for vehicle areas above the creeper Additionally, one or more high intensity lights are mounted on the attachment to illuminate specific crevices or hard-to-see vehicle surfaces that may not be fully illuminated by the fluorescent lights.

The attachment may include a tool tray at the "headrest" end of the floor creeper. Such a tray enables wrenches, screw drivers, miscellaneous bolts, etc. to be within reach of the mechanic while he is laying on the creeper. He can reach beyond his head into the tray and select a tool or component, using his sense of feel; he does not actually need to see the component to make a selection. The use of a tool tray on a creeper avoids the need for the mechanic having to slide out from beneath the vehicle in order to obtain the proper tool or part. During a vehicle servicing operation any grease-laden components and tools can be deposited into the tray (while the person is lying on the creeper); the mechanic does not have to place such greasy items in his pocket in order to prevent them from being lost or mislaid. Everything can be located in one central spot, i.e. the tool tray.

The attachment is a unitary structure that can be installed on a conventional creeper, or removed from the creeper, without special tools. Bolts or screws can be used to removably mount the attachment on the creeper.

THE DRAWINGS

DESCRIPTION OF A PREFERRED EMBODIMENT OF THE INVENTION

Figure 1:
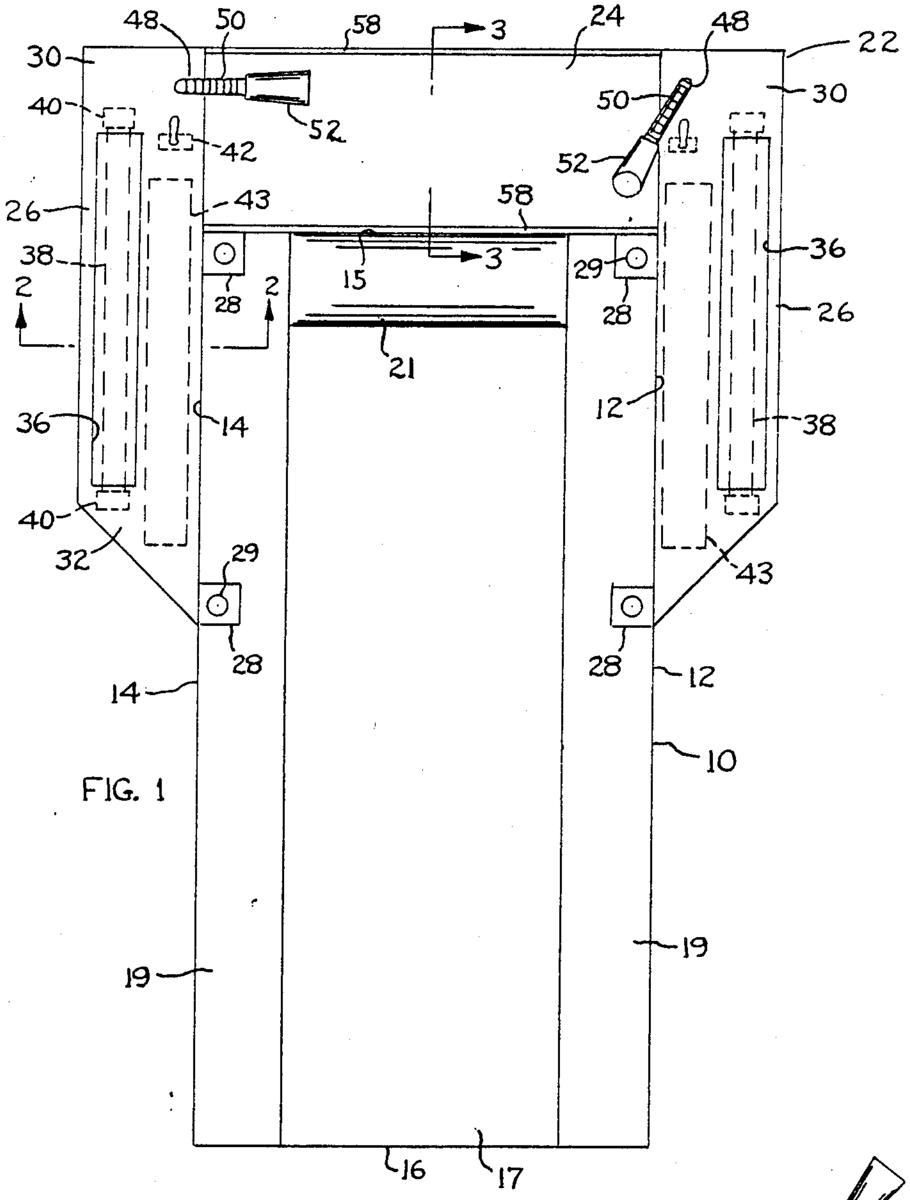
FIG. 1 is a top plan view of a conventional floor creeper having an attachment of the present invention mounted thereon.

FIG. 1 shows a conventional floor creeper 10 having two said edges 12 and 14, and two end edges 15 and 16. The creeper may be formed out of a one half inch thick plywood member 17 and two wooden plank side members 19. Four casters 20 are attached to the undersurface of member 17 near its four corners. Typically, the floor creeper has a width on the order of fifteen to twenty inches, and a length on the order of forty two inches. A foam rubber headrest 21 may be carried on the creeper at one of its ends.

My improved attachment 22 is a U-shaped structure that includes a tool tray 24 at the "headrest" end of creeper 10, and two elongated light housings 26 extending from opposite ends of tray 24 adjacent side edges 12 and 14 of the creeper (when the attachment is in its installed position). Light housings 26 are welded (or otherwise affixed) to tray 24 so that the complete attachment can be handled as a unit. The attachment includes four apertured plates 28 that overlie the upper surfaces of the creeper when the attachment is placed in its FIG. 1 position. A screw or bolt 29 can be extended through the aperture in each plate 28 to removably secure the U-shaped attachment to the creeper.

Figure 2:
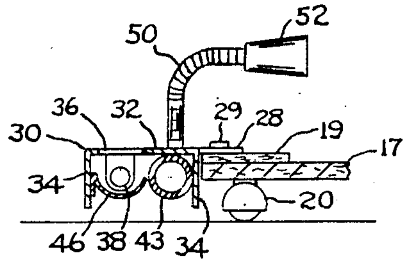
FIG. 2 is a fragmentary sectional view taken on line 2—2 in FIG. 1

The two light housings 26 are generally similar to one another, differing only in that one is the mirror image of the other. As shown in FIG. 2, the light housing comprises a horizontal channel 30 having a web wall 32 and two downwardly-extending flanges 34. An elongated opening 36 is formed in wall 32.

A conventional twelve volt fluorescent light 38 is mounted between electrical connectors 40 in the space directly below opening 36; light 38 may be approximately twelve inches in length. Connectors 40 are electrically wired to a manual switch 42 and dry cell batteries located within an elongated sleeve 43 that extends parallel to fluorescent light 38. The batteries provide electrical power for the fluorescent light, under the control of on-off switch 42.

In preferred practice of the invention battery recharging jack is located at one end of sleeve 43. During periods when attachment 22 is not in use the jack can be connected to a household electrical outlet, via an extension cord, to recharge the dry cell batteries. When the attachment is in use the extension cord is disconnected from the jack.

Fluorescent light 38 is located directly above a reflector 46 that extends approximately the full length of the light. Light rays are directed upwardly to illuminate undersurface areas of automotive vehicle. A light-transmitting plate or window (not shown) can be removably mounted within opening 36 to protect fluorescent bulb 38 from damage by falling objects.

As previously noted, there are two laterally spaced light housings 26. Each housing carries therewithin a fluorescent light 38, battery support sleeve 43, and control switch 42. The use of two laterally-spaced fluorescent lights 38 is advantageous in that the vehicle underbody is then illuminated from two different directions. The fan-shaped light patterns overlap one another to eliminate shadows that could be formed when using only one light. The two lights illuminate crevices and oblique surfaces that could not be illuminated with only one light.

Some areas of a vehicle underbody may require the use of a high intensity light in order to be fully illuminated. The illustrated attachment structure includes two high intensity lights 48 mounted on web walls 32 of the respective channels 30. Each high intensity light includes a flexible articulated tube 50 extending upwardly from channel wall 32. Electrical wiring extends through the flexible tube to a small three amp bulb within a cone-shaped reflector 52. An on-off switch may be located on reflector 52 or on channel wall 32 to control the high intensity light. The light is wired to the stack of batteries in sleeve 43 (FIG. 2) in electrical parallelism with fluorescent bulb 38.

Flexible tube 50 may be on the order of eight inches in length. It can be bent in various directions to adjust the direction and spacing of the light bulb from web wall 32. The mechanic can adjust tube 50 while lying prone on creeper 10.

Figure 3:
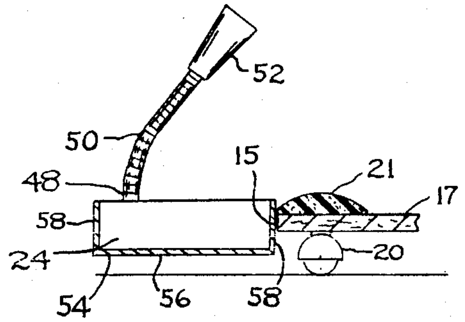
FIG. 3 is a fragmentary sectional view taken on line 3—3 in FIG. 1.

The aforementioned tool tray 24 is formed by a third channel 54 extending between channels 30 at the "headrest" end of the creeper. As seen in FIG. 3, channel 54 includes a web wall 56 and two upwardly-extending flanges 58. End edges of channel 54 are welded or otherwise secured to the inner flanges of channel 30, such that the three channels are in a common horizontal plane. Aforementioned plates 28 are welded to channels 30.

When the U-shaped attachment structure is positioned so that plates 28 rest on creeper 10 the web walls 32 of channels 30 will be in approximate planar alignment with the upper face of the creeper. Thus, the U-shaped attachment will not project appreciably above the creeper surface so as to be in danger of striking portions of the vehicle underbody. Lights 48 can be brought down relatively close to channel walls 32 by bending tubes 50.

Tool tray 24 provides an accessible space on the attachment structure for holding tools, fasteners, and vehicle parts. The mechanic can reach the tray by extending his arm beyond his head, while lying prone on the creeper. Items can be selected from the tray by the sense of touch. If the person has long hair the tray will keep the hair from engagement with the floor.

The drawings show one form that the invention can take. Other forms are possible.

I claim:

1. An attachment for a floor creeper having a headrest at one of its ends; said attachment comprising a U-shaped wall structure that includes two laterally spaced channels (30) adapted to extend horizontally along opposite side edge areas of a floor creeper, and a third channel (54) extending transversely between said laterally spaced channels at the headrest end of the creeper; each of the laterally spaced channels having a horizontal web wall (32) and two downwardly extending flanges; said third channel including a web wall (56) and two upwardly extending flanges; said channels being located in a common horizontal plane, and the web walls of the laterally spaced channels being in approximate planar alignment with the upper face of the creeper when the attachment is installed thereon;

spacing between the laterally spaced channels being at least as great as the width of the creeper so that the channels are located outside the plan dimension of the creeper;

an elongated opening in the web wall of each of the laterally spaced channels; a fluorescent light arranged within each one of the laterally spaced channels directly below the associated opening whereby the fluorescent lights are adapted to illuminate undersurface areas of an automotive vehicle;

and a high intensity light mounted on the web wall of at least one of the laterally spaced channels; each high intensity light including a flexible tube means extending upwardly from the associated channel web wall, whereby the high intensity light can be adjusted as to its direction and spacing from the associated web wall; said third channel having opposite ends thereof closed by the laterally spaced channels, whereby said third channel constitutes an upwardly opening tool tray.

2. The attachment of claim 1 and further comprising a plural number of apertured plates (28) affixed to inboard sections of the laterally spaced channels, said apertured plates being adapted to rest an upper face areas of a creeper when the attachment is installed thereon; said apertured plates constituting means for detachably suspending the attachment on the creeper.

3. The attachment of claim 2 wherein lower edges of the flanges on the laterally spaced channels are in a common plane with the web wall of the third channel.

* * * * *